N. B. WALES.
APPARATUS FOR GENERATING MOTIVE FLUID.
APPLICATION FILED APR. 8, 1907.
989,214.
Patented Apr. 11, 1911.
2 SHEETS—SHEET 1.
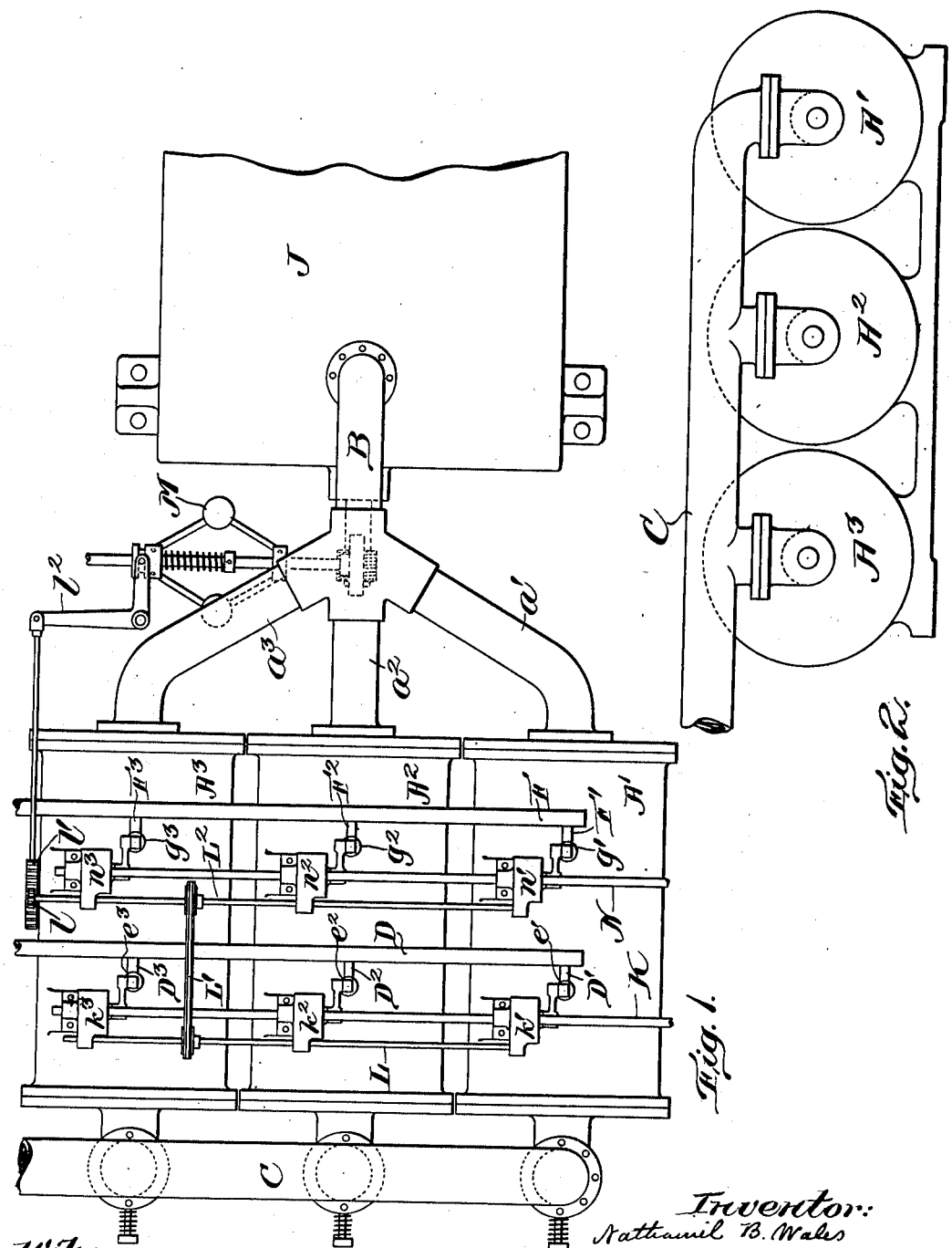
Witnesses:
Geo. N. Goddard
H. A. Dugan
Inventor:
Nathaniel B. Wales
by Ira L. Fish
Attorney.

N. B. WALES.
APPARATUS FOR GENERATING MOTIVE FLUID.
APPLICATION FILED APR. 8, 1907.
989,214.
Patented Apr. 11, 1911.
2 SHEETS—SHEET 2.
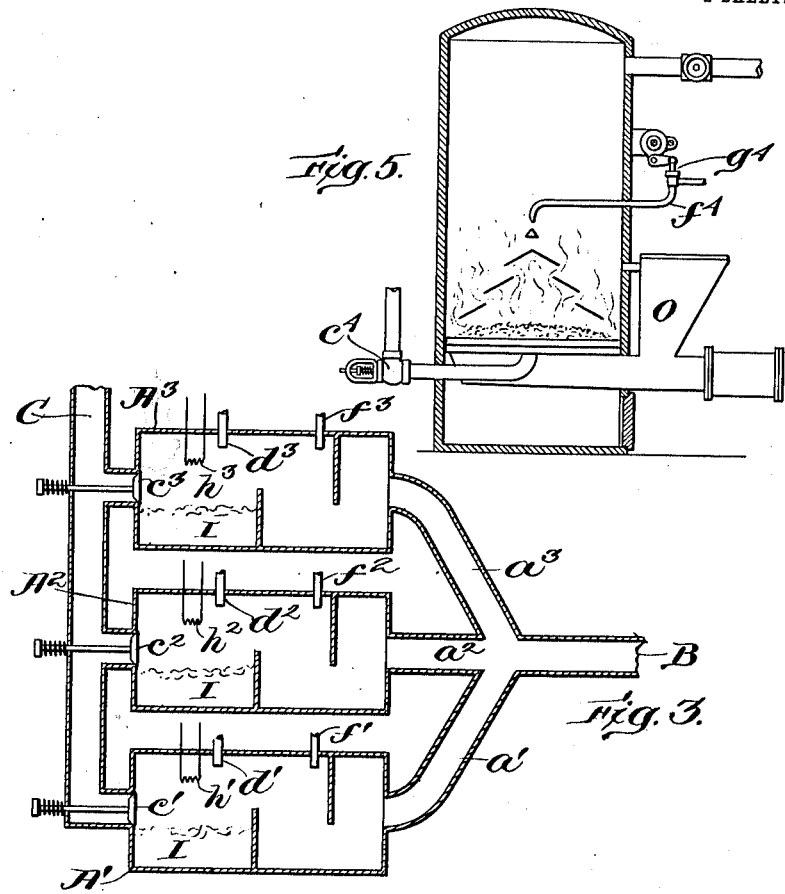
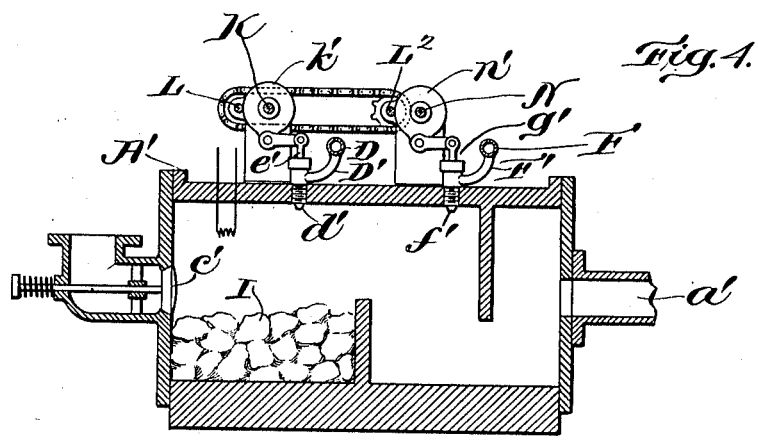
Witnesses:
Geo. N. Goddard
H. A. Dugan
Inventor:
Nathaniel B. Wales
by Ira L. Fish
Attorney.

UNITED STATES PATENT OFFICE.

NATHANIEL B. WALES, OF BRAINTREE, MASSACHUSETTS, ASSIGNOR TO GUY B. COLLIER, OF KINDERHOOK, NEW YORK.

APPARATUS FOR GENERATING MOTIVE FLUID.

989,214.  Specification of Letters Patent.  Patented Apr. 11, 1911.

Application filed April 8, 1907. Serial No. 366,960.

*To all whom it may concern:*

Be it known that I, NATHANIEL B. WALES, citizen of the United States, and resident of Braintree, county of Norfolk, Massachusetts, have invented certain new and useful Improvements in Apparatus for Generating Motive Fluid, of which the following is a specification.

The invention relates to an apparatus for generating a motive fluid consisting of steam intermingled with the products of combustion from the fuel burned in generating steam.

It is the primary object of the invention to provide an apparatus of this character which shall be simple and durable in construction and by which a motive fluid having sufficient weight and a sufficiently low temperature for practical and economical use in turbine motors may be rapidly and economically generated.

In accordance with the principal feature of the invention a series of generating chambers are connected with a common discharge conduit in such manner that a change of pressure in one causes a similar change in the others and water is supplied to and fuel rapidly burned in one chamber after another, the supply of water and the rapid burning of fuel in each chamber ceasing before beginning in the next. Thus motive fluid is generated intermittently and successively in the series of chambers and the pressure in the chambers and in the discharge conduit rises and falls as the rapid combustion and supply of water successively takes place and ceases in the different chambers. When the rapid generation of motive fluid in one of the chambers ceases the pressure in the three chambers rapidly falls until the generation of motive fluid begins in the next succeeding chamber, when the pressure in the three chambers quickly rises and is maintained until the generation of fluid in this chamber ceases, when the pressure in the three chambers again falls until the generation of motive fluid begins in the next chamber and thus the pressure in the chambers continues to rise and fall and the motive fluid to be intermittently and successively generated in the chambers.

The air to support the combustion in the chambers as well as the supply of water and the supply of fuel in case a liquid or gaseous fuel is used may take place at the time when the pressure in the chambers is at or near the minimum and thus the work required to raise the pressure of the air and other materials fed into the chambers be reduced to a minimum with a resulting increase in the efficiency of the apparatus.

Certain features of the invention contemplate controlling the supply of air to the combustion chambers by check valves constructed to open when the pressure in the chambers falls below a predetermined point and thus open communication between the chambers and the source of supply for the compressed air.

Gaseous, liquid or solid fuel may be employed in practicing the broader features of the invention and in case gaseous or liquid fuel is employed the fuel, as well as the water, may be successively and intermittently supplied to the chambers.

The interval during which water is supplied to each of the chambers, and in case gaseous or liquid fuel is employed, the interval during which such fuel is supplied to the chambers, may be controlled from the motor to which the motive fluid is delivered so that the quantity of motive fluid generated shall be automatically controlled according to the requirements of the motor and such control forms a feature of the invention.

The features above referred to, as well as the further features which will be more particularly set forth in the claims, will be understood from the drawings, in which two forms of apparatus are shown embodying some or all of the features of the invention.

In these drawings Figure 1 is a plan view illustrating one form of apparatus embodying the invention. Fig. 2 is an end view of the series of combustion chambers showing the pipe for supplying compressed air thereto. Fig. 3 is a diagrammatic view illustrating the arrangement of the combustion chambers indicated in Fig. 1. Fig. 4 is a vertical sectional view through one of the combustion chambers; and Fig. 5 is a view illustrating a modified form of combustion chamber adapted for burning solid fuel.

In the apparatus indicated in Figs. 1 to 4 a series of three combustion chambers A' A² A³ are in open communication with a common discharge pipe B through the pipes $a'$ $a^2$ $a^3$, the arrangement being such that a rise or fall in pressure in any one of the combustion chambers will cause a corresponding rise or fall in the pressure within the other chambers. The combustion chambers are provided at or near their rear ends with check valves $c'$ $c^2$ $c^3$ which control the communication between the chambers and a pipe C in which air pressure of a predetermined amount is maintained. Fuel is supplied to the different chambers through pipes $d'$ $d^2$ $d^3$ which communicate with a common supply pipe D through branch pipes $D'$ $D^2$ $D^3$. The supply of fuel through the supply pipes $d'$ $d^2$ $d^3$ is controlled by valves $e'$ $e^2$ $e^3$ which may be opened and closed at intervals by any suitable mechanism. Water is supplied to the combustion chambers by means of pipes $f'$ $f^2$ $f^3$ which communicate with a common supply pipe F through branch pipes $F'$, $F^2$, $F^3$. The supply of water through the pipes $f'$ $f^2$ $f^3$ is controlled by valves $g'$ $g^2$ $g^3$ which may be opened and closed at proper intervals by any suitable mechanism. Each of the combustion chambers is provided with an igniting device indicated at $h'$, $h^2$, $h^3$ which may be employed for igniting the fuel in starting the apparatus or during its operation. It is preferred however to employ these igniting devices for starting the apparatus and to provide each combustion chamber with a bed I of lavite rock or other refractory material which may be raised to a high temperature by the burning of the fuel and will serve to ignite the fuel when it is delivered to the chamber during the running of the apparatus.

During the running of the apparatus the cycle of operations is as follows. Supposing the feed valve $e'$ for the chamber $A'$ to be open, fuel will be supplied to the chamber $A'$ and being mixed with the air which has been admitted to the chamber will rapidly burn or explode according to the nature of the fuel, causing the pressure to rise in the chamber $A'$ and in the other chambers. At the same time the valve $g'$ is open to supply water to the chamber $A'$ and this water flashes into steam, further increasing the pressure in the chamber $A'$. The generation of motive fluid will continue as long as the valve $e'$ and $g'$ remain open and this fluid will be supplied to the motor or other device where it is to be used through the pipe $a'$ and conduit B. When the valves $e'$ and $g'$ are closed the pressure in the chamber $A'$ and in the other chambers rapidly falls as the motive fluid is discharged. When the pressure in the chambers falls below the air pressure in the pipe C, the valves $c'$, $c^2$, $c^3$ open, allowing a quantity of air to flow into each of the chambers. Immediately after the valves $c'$, $c^2$, $c^3$ have thus opened, the valve $e^2$, $g^2$ for the chamber $A^2$ open to supply fuel and water to this chamber. The motive fluid is then generated in the chamber $A^2$ and the pressure rises in the three chambers, causing the valves $c'$, $c^2$, $c^3$ to close. When the valves $e^2$, $g^2$ are closed the pressure again falls in the three chambers and a second quantity of air is admitted through the valves $c'$, $c^2$, $c^3$. Then the valves $e^3$, $g^3$ for the chamber $A^3$ are open, the motive fluid is generated in this chamber causing the pressure to rise in the chambers and the valves $c'$, $c^2$, $c^3$ to again close, the motive fluid flowing to the discharge pipe through the pipe $a^3$. When the valves $e^3$, $g^3$ are closed the pressure again falls and air is again supplied through the valves $c'$, $c^2$, $c^3$. Then the valves $e'$, $g'$ for the chamber $A'$ again open and motive fluid is again generated in the first chamber. Thus during the operation of the machine the motive fluid is generated intermittently and successively in the chambers, an interval elapsing between the generation of the motive fluid in one chamber and the generation of the motive fluid in the next succeeding chamber, so that the pressure in the chambers drops, thus allowing the air to be fed to the chambers under a comparatively low pressure.

In the construction shown the motive fluid is delivered to a motor of the turbine type indicated at J and the interval during which the water valve or fuel valve or both the water and fuel valves are open is governed by the speed of the motor so that the quantity of motive fluid generated is automatically controlled according to the load on the motor. Any suitable operating and controlling devices may be employed for operating the water and fuel valves at proper intervals and in regular rotation and for controlling the interval during which the valves are open. One form of such mechanism is indicated in Figs. 1 and 4. As shown in these views the fuel supply valves are open and closed by mechanism inclosed in the casings $k'$, $k^2$, $k^3$. The operating mechanism should be so constructed and arranged that the valves are opened in regular succession, while the closing of the valves may be regulated to vary the interval during which they are open. The mechanism indicated for thus operating the valve is of the construction shown and described in my application Serial No. 350,739 filed January 4, 1907.

As indicated the devices for opening and closing the valves are operated by a rotary shaft K, the devices being so arranged that the valves are open in regular succession. The closing of the valves is controlled by a shaft L which is connected by a chain $L'$ with a similar shaft $L^2$ by which the closing of the water valves is controlled. The shaft $L^2$ is connected through a pinion $l$ and rack bar $l'$ with a bellcrank lever $l^2$ which is operated by the governor M driven from the motor J.

The water valves are opened and closed in regular rotation by means of mechanism similar to that shown in the application above referred to and mounted in the casings $n'$, $n^2$, $n^3$. The devices for opening and closing the valves are operated by a shaft N and the closing of the valves is controlled by the shaft $L^2$ above referred to.

When the speed of the motor rises above normal, the shafts L, $L^2$ are shifted to shorten the time during which the valves remain open, while a decrease in the speed of the motor causes the valves to remain open a longer interval. Thus the quantity of motive fluid generated is governed according to the requirements of the device to which it is being delivered.

In Fig. 5 a modified form of combustion chamber adapted for the use of solid fuel such as coal is illustrated. In an apparatus provided with a series of chambers such as shown in this view, the fuel may be supplied to the chambers in any suitable manner as for instance by the use of a "Jones underfeed stoker" indicated at O. As here shown the air is supplied to the chamber through a check-valve $c^4$ arranged in the pipe which leads to the draft openings in the grate of the stoker. The water is supplied to the chamber through a pipe $f^4$, the supply of water being controlled by a valve $g^4$. In this case the water delivered through the water pipe falls upon a series of plates which are arranged above the grate and are heated by the combustion of the coal, the water being flashed into steam as it flows toward or strikes the plate.

In the operation of this type of apparatus when the water valve is open the water discharged through the water pipe flashes into steam, thus suddenly raising the pressure in the chamber. The pressure is maintained, while the motive fluid is discharging from the chamber as long as the water valve remains open. When the water valve closes the discharge of the motive fluid from the chamber causes the pressure to fall in this chamber, as well as in the other chambers of the series used in the apparatus and when the pressure in the chambers falls below the air pressure in the air pipes, the air valves open and air is supplied to cause a rapid burning of the coal on the grate. When the water valve in the next succeeding chamber is opened and steam generated in this chamber, the pressure in the chambers rises and the air valves close and remain closed until the pressure in the chambers again falls upon the closing of this water valve. The water valves for this form of apparatus may be controlled from the motor to which the motive fluid is delivered in the same manner as indicated with reference to the constructions indicated in Figs. 1 and 4.

Various changes and modifications in the construction and arrangement of the parts may be made in practicing the invention and the specific forms and arrangements shown and described are more or less diagrammatic and have been employed merely for the purpose of illustrating forms of apparatus in which the features of the invention may be embodied.

Without attempting to point out in detail the various constructions and modifications which may be made in practicing the invention, what I claim is:—

1. A fluid pressure generator comprising a plurality of combustion chambers, a common discharge conduit with which the chambers communicate in such manner that a rise or fall of pressure in one causes a similar change in the others, means for successively and intermittently supplying water to said chambers and for intermittently effecting a rapid combustion in said chambers.

2. A fluid pressure generator comprising a plurality of combustion chambers, a common discharge conduit with which the chambers communicate in such manner that a rise or fall of pressure in one causes a similar change in the others, a fuel supply for each chamber, means for supplying air to each chamber when the pressure falls below a predetermined point, and means for successively and intermittently supplying water to said chambers.

3. An apparatus having in combination a plurality of combustion chambers, a common discharge conduit with which the chambers communicate in such manner that a change of pressure in one causes a similar change in the others, a fuel supply for each chamber, means for supplying air to each chamber when the pressure falls below a predetermined point, means for successively and intermittently supplying water to said chambers, a motor to which the discharge conduit delivers, and means for controlling the interval during which the water is supplied to each chamber by the speed of the motor.

4. A fluid pressure generator comprising a plurality of combustion chambers, a common discharge conduit with which the chambers communicate in such manner that a rise or fall of pressure in one causes a similar change in the others, means for supplying air to each chamber when the pressure in the chambers falls below a predetermined point, and means for successively and intermittently supplying fuel and water to said chambers.

5. An apparatus having in combination a plurality of combustion chambers, a common discharge conduit with which the chambers communicate in such manner that a change of pressure in one causes a similar change in the others, a fuel supply for each chamber, means for supplying air to each chamber when the pressure falls below a predetermined point, means for successively and intermittently supplying fuel and water to said chambers, a motor to which the discharge conduit delivers, and means for controlling the intervals during which the fuel and water is supplied to each chamber by the speed of the motor.

6. A fluid pressure generator comprising a plurality of combustion chambers, a common discharge conduit with which the chambers communicate in such manner that a rise or fall of pressure in one causes a similar change in the others, means for supplying air under pressure, a check-valve in each chamber for controlling the supply of air thereto, a fuel supply for each chamber, a water supplying device for each chamber, and means for opening and closing the water supplying devices for the different chambers in succession.

7. A fluid pressure generator comprising a plurality of combustion chambers, a common discharge conduit with which the chambers communicate in such manner that a rise or fall of pressure in one causes a similar change in the others, means for supplying air to each chamber when the pressure in the chambers falls below a predetermined point, a fuel supplying device for each chamber, a water supplying device for each chamber, and devices for opening and closing the supplying devices of the different chambers in succession.

8. An apparatus having in combination a plurality of combustion chambers, a common discharge conduit with which the chambers communicate in such manner that a change of pressure in one causes a similar change in the others, means for supplying air to each chamber when the pressure in the chambers falls below a predetermined point, a fuel supplying device for each chamber, a water supplying device for each chamber, devices for opening and closing the supplying devices of the different chambers in succession, a motor to which the discharge conduit delivers, and means for controlling the interval during which the supplying devices for each chamber are open by the speed of the motor.

9. A fluid pressure generator comprising a plurality of combustion chambers, a common discharge conduit through which the chambers communicate in such manner that a rise or fall of the pressure in one causes a similar change in the others, means for supplying air to each chamber when the pressure in the chambers falls below a predetermined point, and means for successively and intermittently supplying fuel to said chambers.

10. A fluid pressure generator comprising a plurality of combustion chambers, a common discharge conduit with which the chambers communicate in such manner that a rise or fall of pressure in one causes a similar change in the others, a fuel supply for each chamber, means for supplying air to each chamber if the pressure falls below a predetermined point above atmospheric pressure, and means for successively and intermittently supplying water to said chambers.

11. A fluid pressure generator comprising a plurality of combustion chambers, a common discharge conduit with which the chambers communicate in such manner that a rise or fall of pressure in one causes a similar change in the others, means for supplying air to each chamber when the pressure in the chamber falls below a predetermined point above atmospheric pressure, and means for successively and intermittently supplying fuel and water to said chambers.

12. A fluid pressure generator comprising a plurality of combustion chambers, a common discharge conduit with which the chambers communicate in such manner that a rise or fall of pressure in one causes a similar change in the others, means for supplying air under pressure greater than atmospheric pressure, a check valve in each chamber for controlling the supply of air thereto, a fuel supply for each chamber, a water supplying device for each chamber, and actuating mechanism operating to open and close the water supplying devices for the different chambers in succession.

In witness whereof, I have hereunto set my hand, this 3rd day of April 1907.

NATHANIEL B. WALES.

In the presence of—
 IRA L. FISH,
 KATHARINE A. DUGAN.